US008977551B2

(12) United States Patent
Wu et al.

(10) Patent No.: US 8,977,551 B2
(45) Date of Patent: Mar. 10, 2015

(54) PARAMETRIC SPEECH SYNTHESIS METHOD AND SYSTEM

(75) Inventors: Fengliang Wu, Weifang (CN); Zhenhua Wu, Weifang (CN)

(73) Assignee: Goertek Inc., Weifang (CN)

( * ) Notice: Subject to any disclaimer, the term of this patent is extended or adjusted under 35 U.S.C. 154(b) by 275 days.

(21) Appl. No.: 13/640,562

(22) PCT Filed: Oct. 27, 2011

(86) PCT No.: PCT/CN2011/081452
§ 371 (c)(1),
(2), (4) Date: Oct. 11, 2012

(87) PCT Pub. No.: WO2013/020329
PCT Pub. Date: Feb. 14, 2013

(65) Prior Publication Data
US 2013/0066631 A1 Mar. 14, 2013

(30) Foreign Application Priority Data
Aug. 10, 2011 (CN) .......................... 2011 1 0229013

(51) Int. Cl.
*G10L 13/00* (2006.01)
*G10L 13/08* (2013.01)
(Continued)

(52) U.S. Cl.
CPC ........... *G10L 13/08* (2013.01); *G10L 2015/227* (2013.01)
USPC ........... 704/258; 704/230; 704/260; 704/500; 704/243; 704/267; 379/88.03

(58) Field of Classification Search
USPC ................. 704/258, 260, 500, 230, 243, 267; 379/88.03
See application file for complete search history.

(56) References Cited

U.S. PATENT DOCUMENTS 7,478,039 B2 1/2009 Stylianou et al.
7,996,222 B2 8/2011 Nurminen et al.
(Continued)

FOREIGN PATENT DOCUMENTS

CN 101178896 A 5/2008
CN 101369423 A 2/2009

OTHER PUBLICATIONS

Spectral conversion based on maximum likelihood estimation considering global variance or converted parameter by Tomoki Toda, Alan Black and Keiichi Tokuda, ICASSP, 2005.*
(Continued)

*Primary Examiner* — Paras D Shah
*Assistant Examiner* — Neeraj Sharma
(74) *Attorney, Agent, or Firm* — Troutman Sanders LLP

(57) ABSTRACT

The present invention provides a parametric speech synthesis method and a parametric speech synthesis system. The method comprises sequentially processing each frame of speech of each phone in a phone sequence of an input text as follows: for a current phone, extracting a corresponding statistic model from a statistic model library and using model parameters of the statistic model that correspond to the current frame of the current phone as rough values of currently predicted speech parameters; according to the rough values and information about a predetermined number of speech frames occurring before the current time point, obtaining smoothed values of the currently predicted speech parameters; according to global mean values and global standard deviation ratios of the speech parameters obtained through statistics, performing global optimization on the smoothed values of the speech parameters to generate necessary speech parameters; and synthesizing the generated speech parameters to obtain a frame of speech synthesized for the current frame of the current phone. With this solution, the capacity of an RAM needed by speech synthesis will not increase with the length of the synthesized speech, and the time length of the synthesized speech is no longer limited by the RAM.

10 Claims, 8 Drawing Sheets

(51) Int. Cl.

| | |
|---|---|
| *G10L 21/00* | (2013.01) |
| *G10L 15/00* | (2013.01) |
| *H04M 1/64* | (2006.01) |
| *G10L 15/22* | (2006.01) |

(56) References Cited

U.S. PATENT DOCUMENTS

| | | | | |
|---|---|---|---|---|
| 8,200,497 | B2 * | 6/2012 | Hardwick | 704/500 |
| 8,321,222 | B2 * | 11/2012 | Pollet et al. | 704/260 |
| 8,744,853 | B2 * | 6/2014 | Nishimura et al. | 704/260 |
| 2003/0097260 | A1 * | 5/2003 | Griffin et al. | 704/230 |
| 2004/0172249 | A1 * | 9/2004 | Taylor et al. | 704/260 |
| 2006/0129399 | A1 * | 6/2006 | Turk et al. | 704/256 |
| 2006/0229877 | A1 * | 10/2006 | Tian et al. | 704/267 |
| 2007/0276666 | A1 * | 11/2007 | Rosec et al. | 704/260 |
| 2009/0157408 | A1 * | 6/2009 | Kim | 704/260 |
| 2011/0218804 | A1 * | 9/2011 | Chun | 704/243 |
| 2012/0143611 | A1 * | 6/2012 | Qian et al. | 704/260 |

OTHER PUBLICATIONS

Takashi Nose, Koujirou Ooki and Takao Kobayashi, HMM-based speech synthesis with unsupervised labeling of accentual context based on F0 quantization and average voice model, ICASSP, 2010.*
Heiga Zen, Keiichi Tokuda and Alan Black, Statistical parametric speech synthesis, Speech Communication, 2009.*
Paul Bagshaw, Unsupervised training of phone duration and energy models for text-to-speech synthesis, ICSLP, 1998).*
Tomoki Toda and Steve Young, Trajectory training considering global variance for HMM-based speech synthesis, ICASSP, 2009.*
Heiga Zen, Keiichi Tokuda and Alan Black, Statistical parametric speech synthesis: a review, Speech Communication, 2009.*
International Search Report dated May 24, 2012 to PCT/CN2011/081452.

* cited by examiner

PARAMETRIC SPEECH SYNTHESIS METHOD AND SYSTEM

TECHNICAL FIELD

The present invention generally relates to the technical field of parametric speech synthesis, and more particularly, to a parametric speech synthesis method and a parametric speech synthesis system for continuously synthesizing speech of any time length.

DESCRIPTION OF RELATED ART

Speech synthesis is for generating artificial speech mechanically and electronically and is an important technology that makes human-machine interaction more natural. Currently, there are two kinds of common speech synthesis technologies: one kind is speech synthesis method based on unit selection and waveform concatenation, and the other kind is parametric speech synthesis method based on acoustic statistic model. The parametric speech synthesis method has relatively low requirements on the storage space and thus is more suitable for use in small electronic apparatuses.

A parametric speech synthesis method is divided into a training phase and a synthesizing phase. Referring to FIG. 1, in the training phase, firstly acoustic parameters of all speech in a corpus are extracted, and the acoustic parameters include static parameters such as frequency-spectrum envelope parameters and fundamental frequency parameters, and dynamic parameters such as first order difference parameters and second order difference parameters of the frequency-spectrum envelope parameters and the fundamental frequency parameters. Then, an acoustic statistic model is trained to correspond to each phone according to context label information thereof, meanwhile, a global variance model is trained for the whole corpus. Finally, a model library is formed by the acoustic statistic model of all the phones and the global variance model.

In the synthesizing phase, the speech is synthesized through hierarchical off-line processing. As shown in FIG. 1, five layers are included. First layer: an input entire text is analyzed to obtain a phone sequence consisting of phones which all have context information. Second layer: models corresponding to each of the phones in the phone sequence are extracted from the trained model library to form a model sequence. Third layer: by maximum likelihood algorithm, acoustic parameters corresponding to each frame of speech are predicted from the model sequence to form speech parameter sequences. Fourth layer: the speech parameter sequences are optimized as a whole by usage of the global variance model. Fifth layer: all the optimized speech parameter sequences are input to a parametric speech synthesizer to generate the final synthesized speech.

In the process of implementing the present invention, the inventor has found at least the following shortcomings existing in the prior art.

The prior art parametric speech synthesis method adopts a transverse processing manner in the hierarchical operations of the synthesizing phase: taking out parameters of all the statistic model; generating smoothed parameters of all the frames through prediction by using the maximum likelihood algorithm; obtaining optimized parameters of all the frames by using the global variance model; and finally, outputting all the frames of speech from the parametric synthesizer. That is, related parameters of all the frames need to be saved in each of the layers, making the capacity of a random access memory (RAM) needed when the speech is synthesized increase in direct proportion to the time length of the synthesized speech. However, the capacity of the RAM on the chip is fixed, and in many applications, the capacity of the RAM on the chip is smaller than 100K bytes. Consequently, the prior art parametric speech synthesis method cannot continuously synthesize speech of arbitrary time length on a chip having an RAM of a small capacity.

Hereinbelow, causes of the aforesaid problem will be further explained in detail in conjunction with the operations of the third layer and the fourth layer in the synthesizing phase.

Referring to FIG. 4, in the operation of the third layer in the synthesizing phase, the process of predicting speech parameter sequences from a model sequence by using the maximum likelihood algorithm must be implemented through both a step of forward recursion and a step of backward recursion frame by frame. After the first step of recursion is completed, temporary parameters corresponding to each frame of speech are generated. Only if the temporary parameters of all the frames are input to the second step of reverse recursion, can necessary parameter sequences be predicted. The longer the time length of the synthesized speech is, the larger the number of corresponding speech frames will be; and temporary parameters corresponding to a frame will be generated when parameters of each frame of speech are predicted. Only if the temporary parameters of all the frames are saved in the RAM, can the second step of recursion prediction be completed. As a result, speech of arbitrary time length cannot be continuously synthesized on a chip having an RAM of a small capacity.

Moreover, in the operation of the fourth layer, it is required to calculate a mean value and a variance from the parameters of all the frames of speech output from the third layer and then to optimize the smoothed values of the speech parameters as a whole by using the global variance model to generate the final speech parameters. Therefore, the corresponding frame number of RAMs are also needed to save the parameters of all the frames of speech output from the third layer, and this also makes it impossible to continuously synthesize speech of arbitrary time length on a chip having an RAM of a small capacity.

BRIEF SUMMARY OF THE INVENTION

In view of the aforesaid problem, an objective of the present invention is to solve the problem that the capacity of an RAM needed in the prior art speech synthesis process increases in direct proportion to the length of the synthesized speech, and consequently, it is impossible to continuously synthesize speech of arbitrary time length on a chip having an RAM of a small capacity.

According to an aspect of the present invention, a parametric speech synthesis method is provided, which comprises a training phase and a synthesizing phase. In the synthesizing phase, each frame of speech of each phone in a phone sequence of an input text is sequentially processed as follows:

for a current phone in the phone sequence of the input text, extracting a corresponding statistic model from a statistic model library and using model parameters of the statistic model that correspond to the current frame of the current phone as rough values of currently predicted speech parameters;

according to the rough values and information about a predetermined number of speech frames occurring before the current time point, filtering the rough values to obtain smoothed values of the currently predicted speech parameters;

according to global mean values and global standard deviation ratios of the speech parameters obtained through statistics, performing global optimization on the smoothed values of the currently predicted speech parameters to generate necessary speech parameters; and synthesizing the generated speech parameters to obtain a frame of speech synthesized for the current frame of the current phone.

Preferably, according to the rough values and information about speech frames occurring at a previous time point, the rough values are filtered to obtain the smoothed values of the currently predicted speech parameters; and the information about the speech frames occurring at the previous time point is smoothed values of speech parameters predicted at the previous time point.

Furthermore, preferably, according to the global mean values and the global standard deviation ratios of the speech parameters obtained through statistics, global optimization is performed on the smoothed values of the currently predicted speech parameters to generate the necessary speech parameters by using the following formula:

$$\tilde{y}_t = r\cdot(y_t - m) + m$$

$$z_t = w\cdot(\tilde{y}_t - y_t) + y_t$$

where $y_t$ represents a smoothed value of a speech parameter at a time point t before optimization, $\tilde{y}_t$ represents a value after preliminary optimization, w represents a weight value, $z_t$ represents the necessary speech parameter obtained after the global optimization, r represents a global standard deviation ratio of a predicted speech parameter obtained through statistics, m represents a global mean value of the predicted speech parameter obtained through statistics, and r and m are constants.

Further, this solution further comprises: using sub-band voicing degree parameters to construct a voiced sound sub-band filter and a unvoiced sound sub-band filter; filtering a quasi-periodic pulse sequence constructed by fundamental frequency parameters in the voiced sound sub-band filter to obtain a voiced sound component of a speech signal; filtering a random sequence constructed by white noises in the unvoiced sound sub-band filter to obtain a unvoiced sound component of the speech signal; adding the voiced sound component and the unvoiced sound component to obtain a mixed excitation signal; and filtering the mixed excitation signal in a filter constructed by frequency-spectrum envelope parameters to output a frame of synthesized speech waveform.

Further, the method further comprises a training phase prior to the synthesizing phase, wherein in the training phase, acoustic parameters extracted from a corpus comprise only static parameters or comprise both static parameters and dynamic parameters; only static model parameters among model parameters of statistic model obtained after training are retained; and in the synthesizing phase, the static model parameters of the statistic model obtained in the training phase that correspond to the current frame of the current phone are used as the rough values of the currently predicted speech parameters, according to the current phone.

According to another aspect of the present invention, a parametric speech synthesis system is provided, which comprises:

a cycle synthesis device, being configured to perform speech synthesis on each frame of speech of each phone in a phone sequence of an input text sequentially in a synthesizing phase;

wherein the cycle synthesis device comprises:

a rough search unit, being configured to, for a current phone in the phone sequence of the input text, extract a corresponding statistic model from a statistic model library and use model parameters of the statistic model that correspond to the current frame of the current phone as rough values of currently predicted speech parameters;

a smoothing filtering unit, being configured to, according to the rough values and information about a predetermined number of speech frames occurring before the current time point, filter the rough values to obtain smoothed values of the currently predicted speech parameters;

a global optimization unit, being configured to, according to global mean values and global standard deviation ratios of the speech parameters obtained through statistics, perform global optimization on the smoothed values of the currently predicted speech parameters to generate necessary speech parameters; and a parametric speech synthesis unit, being configured to synthesize the generated speech parameters to obtain a frame of speech synthesized for the current frame of the current phone.

Further, the smoothing filtering unit comprises a low-pass filter set, which is configured to, according to the rough values and information about speech frames occurring at a previous time point, filter the rough values to obtain the smoothed values of the currently predicted speech parameters; and the information about the speech frames occurring at the previous time point is smoothed values of speech parameters predicted at the previous time point.

Further, the global optimization unit comprises a global parameter optimizer, which is configured to, according to the global mean values and the global standard deviation ratios of the speech parameters obtained through statistics, perform global optimization on the smoothed values of the currently predicted speech parameters to generate the necessary speech parameters by using the following formula:

$$\tilde{y}_t = r\cdot(y_t - m) + m$$

$$z_t = w\cdot(\tilde{y}_t - y_t) + y_t$$

where $y_t$ represents a smoothed value of a speech parameter at a time point t before optimization, $\tilde{y}_t$ represents a value after preliminary optimization, w represents a weight value, $z_t$ represents the necessary speech parameter obtained after the global optimization, r represents a global standard deviation ratio of a predicted speech parameter obtained through statistics, m represents a global mean value of the predicted speech parameter obtained through statistics, and r and m are constants.

Further, the parametric speech synthesis unit comprises:

a filter constructing module, being configured to use sub-band voicing degree parameters to construct a voiced sound sub-band filter and a unvoiced sound sub-band filter;

the voiced sound sub-band filter, being configured to filter a quasi-periodic pulse sequence constructed by fundamental frequency parameters to obtain a voiced sound component of a speech signal;

the unvoiced sound sub-band filter, being configured to filter a random sequence constructed by white noises to obtain a unvoiced sound component of the speech signal;

an adder, being configured to add the voiced sound component and the unvoiced sound component to obtain a mixed excitation signal; and a synthesis filter, being configured to filter the mixed excitation signal in a filter constructed by frequency-spectrum envelope parameters to output a frame of synthesized speech waveform.

Further, the system further comprises a training device, which is configured to extract from a corpus acoustic parameters which comprise only static parameters or comprise both static parameters and dynamic parameters in a training phase; and only static model parameters among model parameters of statistic model obtained after training are retained; and the rough search unit is configured to, according to the current phone, use the static model parameters of the statistic model obtained in the training phase that correspond to the current frame of the current phone as the rough values of the currently predicted speech parameters in the synthesizing phase.

According to the above descriptions, the technical solutions of the embodiments of the present invention provide a novel parametric speech synthesis solution by using technical means such as information about a speech frame occurring before a current frame, global mean values and global standard deviation ratios of the speech parameters obtained through statistics in advance, etc.

The parametric speech synthesis method and system provided by the present invention adopt a longitudinal processing synthesis means. That is, synthesis of each frame of speech requires four steps of taking out rough values of a statistic model, obtaining smoothed values through filtering, obtaining optimized values through global optimization, and obtaining speech through parametric speech synthesis; and the four steps are repeated for synthesis of each subsequent frame of speech. Thereby, in the parametric speech synthesis process, it is only necessary to save the parameters of the fixed storage capacity needed by the current frame, so that the capacity of the RAM needed for speech synthesis will not increase with the length of the synthesized speech, and the time length of the synthesized speech is no longer limited by the RAM.

In addition, the acoustic parameters adopted in the present invention are static parameters, and only the static mean parameters of the models are saved in the model library, so that the capacity of the statistic model library can be reduced effectively.

Moreover, the present invention adopts the multi-subband unvoiced sound and voiced sound mixed excitation in the speech synthesis process so that unvoiced sounds and voiced sounds in each sub-band are mixed according to the voicing degree. Thereby, the unvoiced sounds and the voiced sounds will no longer have a clear rigid boundary in time, and this can avoid an apparent tone distortion after the speech is synthesized.

This solution can synthesize speech that is highly continuous, consistent and natural, and is conducive to popularization and application of the speech synthesis method on a chip with a small storage space.

To achieve the aforesaid and other relevant objectives, one or more aspects of the present invention include features that will be described in detail hereinbelow and specially indicated in the claims. Some illustrative aspects of the present invention are described in detail in the following description and the attached drawings. However, these aspects indicate only some of various implementations that can use the principle of the present invention. Furthermore, the present invention is intended to include all of these aspects and equivalents thereof.

BRIEF DESCRIPTION OF THE DRAWINGS

By referring to the following detailed description in conjunction with the accompanying drawings and contents of the claims and with more complete understanding of the present invention, other objectives and results of the present invention will become more apparent. In the attached drawings:

Identical reference numbers throughout the attached drawings denote similar or corresponding features or functions.

DETAILED DESCRIPTION OF THE INVENTION

Hereinbelow, embodiments of the present invention will be described in detail with reference to the attached drawings.

Figure 1:
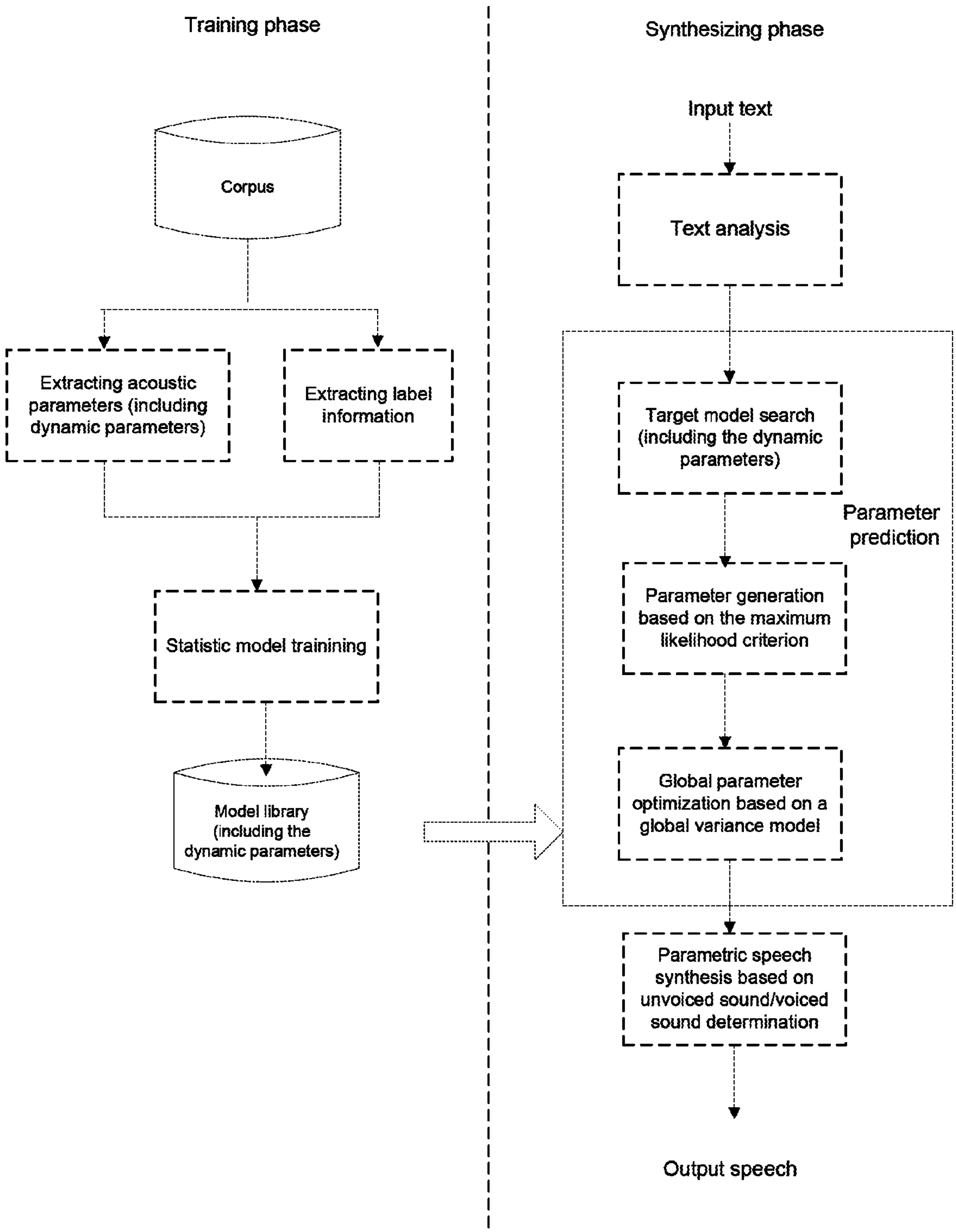
Fig. 1 (PRIOR ART)
FIG. 1 is a schematic view illustrating a parametric speech synthesis method based on dynamic parameters and the maximum likelihood criterion in the prior art which is divided into phases.
Figure 2:
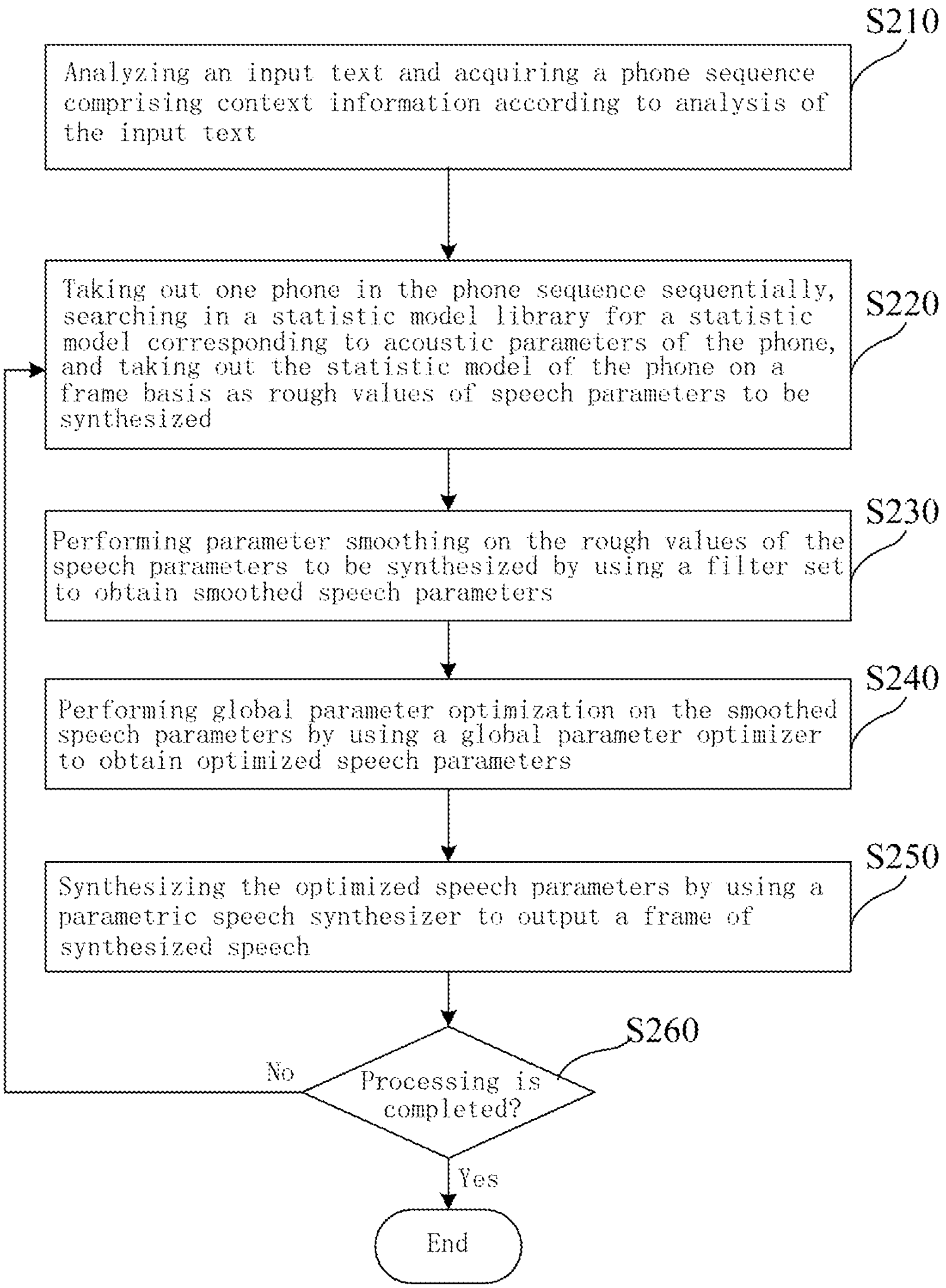
FIG. 2 is a flowchart diagram of a parametric speech synthesis method according to an embodiment of the present invention.

FIG. 2 is a flowchart diagram of a parametric speech synthesis method according to an embodiment of the present invention.

As shown in FIG. 2, the parametric speech synthesis method capable of continuously synthesizing speech of any time length provided by the present invention comprises the following steps of:

S210: analyzing an input text and acquiring a phone sequence comprising context information according to analysis of the input text;

S220: taking out one phone from the phone sequence sequentially, searching in a statistic model library for a statistic model corresponding to acoustic parameters of the phone, and taking out the statistic model of the phone on a frame basis as rough values of speech parameters to be synthesized;

S230: performing parameter smoothing on the rough values of the speech parameters to be synthesized by using a filter set to obtain smoothed speech parameters;

S240: performing global parameter optimization on the smoothed speech parameters by using a global parameter optimizer to obtain optimized speech parameters;

S250: synthesizing the optimized speech parameters by using a parametric speech synthesizer to output a frame of synthesized speech; and S260: determining whether all the frames of the phone are processed; and if not, then repeating the steps S220~S250 on the next frame of the phone until all the frames of all the phones in the phone sequence are processed.

In order to further clearly describe the parametric speech synthesis technology of the present invention to highlight the technical features of the present invention, the following description will be made by contrast with the prior art parametric speech synthesis method on the phase and step basis.

Figure 3:
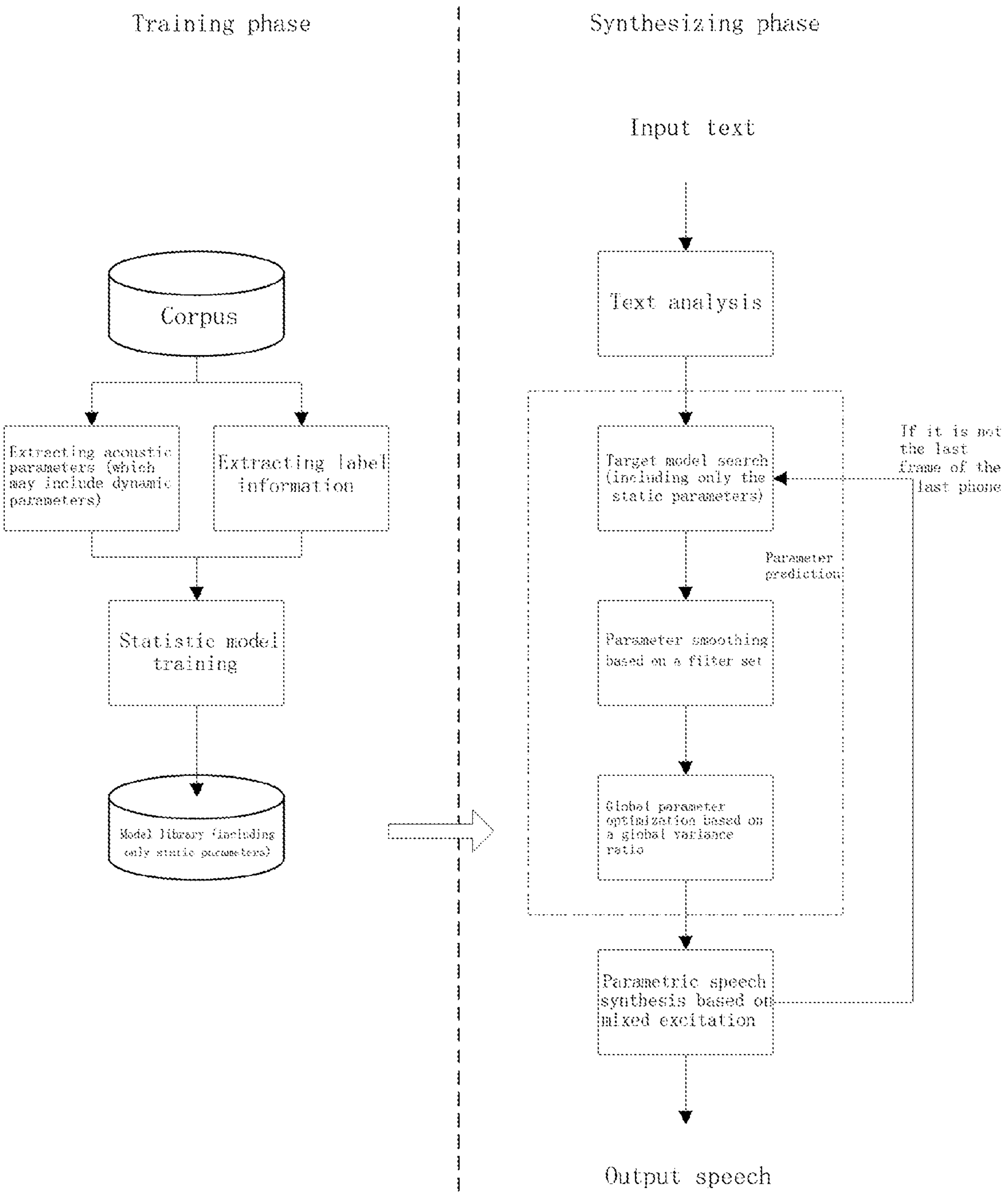
FIG. 3 is a schematic view illustrating a parametric speech synthesis method according to an embodiment of the present invention which is divided into phases.
Figure 4:
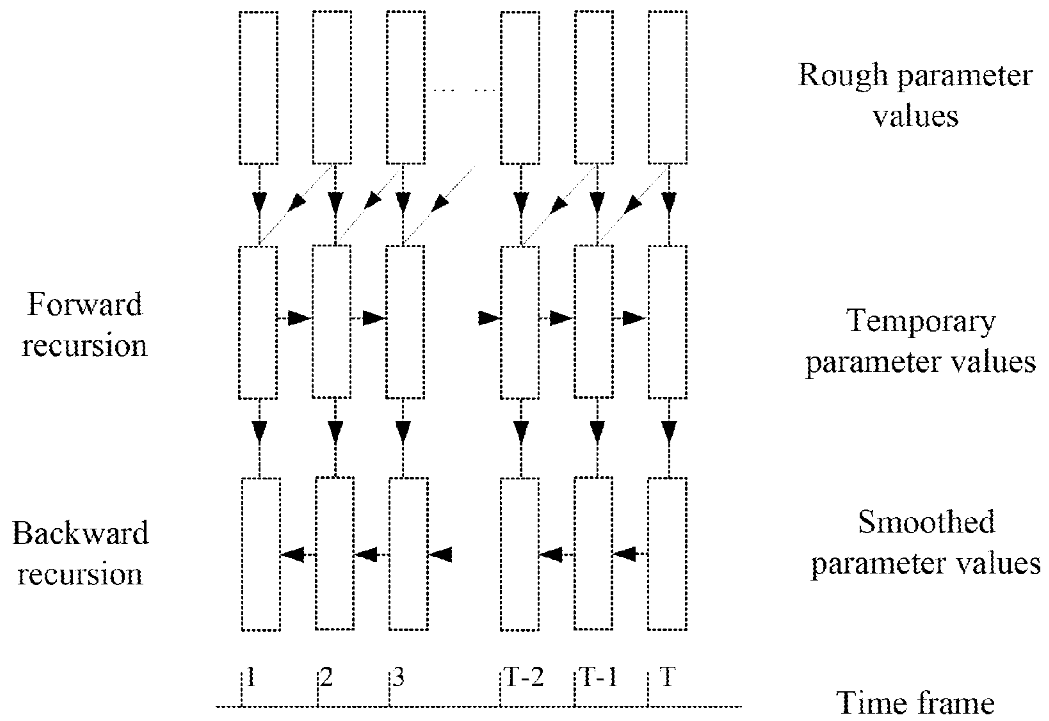
Fig. 4 (PRIOR ART)
FIG. 4 is a schematic view illustrating maximum likelihood parameter prediction based on the dynamic parameters in the prior art.

FIG. 3 is a schematic view illustrating the parametric speech synthesis method according to the embodiment of the present invention which is divided into phases. As shown in FIG. 3, similar to the prior art parametric speech synthesis method based on dynamic parameters and the maximum likelihood criterion, the parametric speech synthesis method of the present invention also comprises a training phase and a synthesizing phase. The training phase is to form a statistic model library of the phones necessary in the synthesizing phase by extracting acoustic parameters of speech from speech information in a corpus and then training a statistic model corresponding to each context information, of each phone, according to the extracted acoustic parameters. The steps S210~S260 belong to the synthesizing phase. The synthesizing phase mainly involves text analysis, parameter prediction and speech synthesis, and the parameter prediction may further be sub-divided into target model search, parameter generation and parameter optimization.

Firstly, in the process of extracting the acoustic parameters from the training corpus in the training phase, the present invention differs from the prior art parametric speech synthesis technology mainly in that: the acoustic parameters extracted in the prior art comprise dynamic parameters; on the other hand, the acoustic parameters extracted in the present invention may all be static parameters or may also comprise dynamic parameters (e.g., first order difference parameters or second order difference parameters), which characterize variations of the parameters of the previous and the next frames, in order to increase the accuracy achieved after model training Specifically, the acoustic parameters extracted from the corpus in the present invention at least comprise three kinds of static parameters, i.e., frequency-spectrum envelope parameters, fundamental frequency parameters, and sub-band voicing degree parameters, and may further optionally comprise other parameters such as formant frequency parameters.

The frequency-spectrum envelope parameters may be linear predictive coefficients (LPCs) or derivative parameters thereof such as linear spectrum pair (LSP) parameters or cepstrum type parameters, and may also be the first several formant parameters (the frequency, the bandwidth and the amplitude) or discrete Fourier transformation coefficients. In addition, variants of these frequency-spectrum envelope parameters in the Mel field may further be used to improve the tone quality of the synthesized speech. The fundamental frequency is a logarithmic fundamental frequency, and the sub-band voicing degree refers to a proportion of voiced sounds in a sub-band.

In addition to the aforesaid static parameters, the acoustic parameters extracted from the corpus may further comprise dynamic parameters characterizing variations of the acoustic parameters of the previous and the next frames, such as first order difference parameters or second order difference parameters between fundamental frequencies of the previous and the next frames. During training, each phone is automatically aligned with a large number of speech segments in the corpus, and then acoustic parameter models corresponding to the phones are obtained through statistics from the speech segments. Using the static parameters and the dynamic parameters in combination for automatic alignment can achieve a slightly higher accuracy than using only the static parameters, and makes the parameters of the models more accurate. However, because the dynamic parameters of the models are not needed in the synthesizing phase of the present invention, only the static parameters are retained in the model library that is finally obtained through training.

In the process of training the statistic model corresponding to the acoustic parameters of each phone under different context informations according to the extracted acoustic parameters, Hidden Markov Models (HMMs) are used to model the acoustic parameters. Specifically, the frequency-spectrum envelope parameters and the sub-band voicing degree parameters are modeled by means of the HMMs of continuous probability distribution, and the fundamental frequency parameters are modeled by means of the HMMs of multi-space probability distribution. This modeling scheme has already been existing in the prior art, and thus will be only briefly described in the following description.

The HMM is a typical statistic signal processing technology and is widely used in various fields of signal processing owing to the features such as having randomicity and a great number of rapid and effective training and identifying algorithms and being capable of processing an input character string with an unknown word length and effectively avoiding the problem of syncopation. The HMM has a 5-status left-right type structure, and the probability distribution observed under each status is a single Gaussian density function. The function is uniquely determined by mean values and variances of parameters. The mean values consist of mean values of the static parameters and mean values of the dynamic parameters (the first order difference parameters and the second order difference parameters). The variances consist of variances of the static parameters and variances of the dynamic parameters (the first order difference parameters and the second order difference parameters).

During training, one model is trained for the acoustic parameters of each phone according to the context information. In order to increase the steadiness of model training, the related phones need to be clustered according to the context information of the phones by, for example, a clustering method based on a decision tree. After training of the models corresponding to the acoustic parameters is completed, an enforced frame-to-status alignment is performed on the speech in the training corpus by means of those models; then, by means of the time-length information (i.e., the number of frames corresponding to each of the statuses) generated during alignment, status time-length models of the phones after being clustered by the decision tree under different context informations are trained; and finally, a statistic model library is formed by the statistic model corresponding to the acoustic parameters of each phone under different context informations.

After the training is completed, only the static mean parameters of the models are saved in the model library according to the present invention. However, the prior art parametric speech synthesis method needs to retain the static mean parameters, the first order difference parameters, the second order difference mean parameters, and corresponding variance parameters thereof, and thus requires a relatively large statistic model library. As proved through practice, the size of the statistic model library of the present invention in which only the static mean parameters of the models are saved is only about 1/6 of that of the statistic model library formed in the prior art, so the present invention can significantly reduce the storage space of the statistic model library. The reduced data is necessary in the prior art parametric speech synthesis technology but is unnecessary in the parametric speech synthesis technical solution of the present invention, so the reduction in amount of the data has no influence on implementation of parametric speech synthesis of the present invention.

In the synthesizing phase, an input text needs to be analyzed firstly in order to extract a phone sequence comprising context information from the input text (step S210), as the basis of parametric synthesis.

Here, the context information of a phone refers to information about phones adjacent to the current phone, and the context information may be names of one or more phone(s) adjacent to the current phone and may also comprise information about other language layers or phonological layers. For example, the context information of one phone comprises a name of the current phone, names of a previous phone and a next phone, and a tone or a stress of a corresponding syllable, and may also optionally comprise a part of speech of a corresponding word, etc.

After the phone sequence comprising the context information in the input text is determined, one phone in the phone sequence can be taken out sequentially, a statistic model corresponding to acoustic parameters of the phone is searched for in a statistic model library, and then the statistic model of the phone are taken out on a frame basis, as rough values of speech parameters to be synthesized (step S220).

The process of searching for the target statistic model can search for the statistic model corresponding to frequency-spectrum envelope parameters, fundamental frequency parameters, sub-band voicing degree parameters, and status time-length parameters by inputting context label information of the phone into a clustering decision tree. The status time-length parameters are not static acoustic parameters extracted from the original corpus but are new parameters generated during alignment of the statuses with the frames in the training phase. The mean values of the saved static parameters are taken out sequentially from each status of the model as the static mean parameters corresponding to the parameters. The status time-length mean parameters are directly used to determine how many frames shall be continued for each status in a certain phone to be synthesized, and the static mean parameters such as the frequency-spectrum envelope parameters, the fundamental frequency parameters, and the sub-band voicing degree parameters are the rough values of the speech parameters to be synthesized.

After the rough values of the speech parameters to be synthesized are determined, the rough values of the speech parameters are filtered in a filter set so as to predict the speech parameters (step S230). In this step, the frequency-spectrum envelope parameters, the fundamental frequency parameters, and the sub-band voicing degree parameters are filtered, respectively, by means of a set of special filters, in order to predict the speech parameter values with a better synthesis effect.

Figure 5:
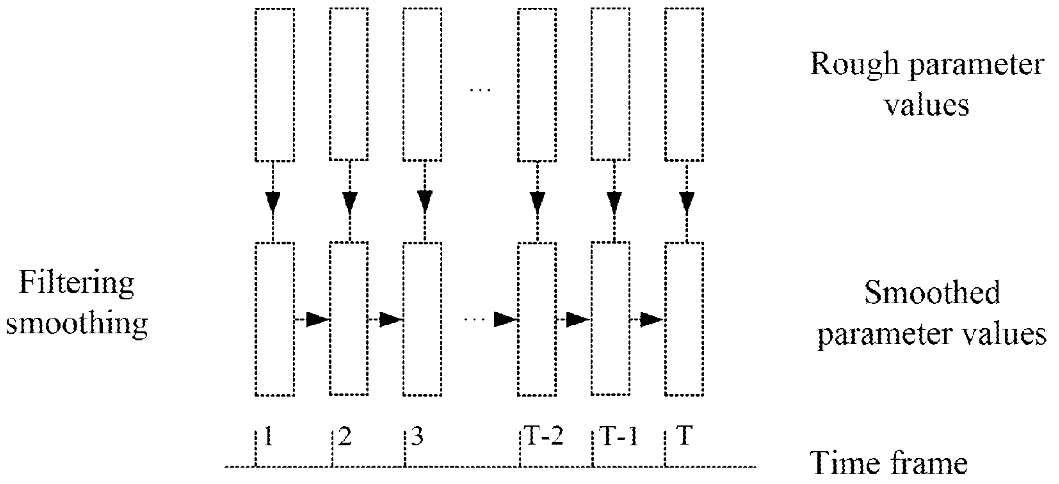
FIG. 5 is a schematic view illustrating filtering smoothing parameter prediction based on static parameters according to an embodiment of the present invention.

The filtering means adopted in the step S230 of the present invention is a smoothing filtering means based on static parameters. FIG. 5 is a schematic view illustrating filtering smoothing parameter prediction based on static parameters according to the present invention. As shown in FIG. 5, the present invention uses this set of parameter prediction filters in replace of the maximum likelihood parameter predictor in the prior art parametric speech synthesis technology and uses a set of low-pass filters to predict the frequency-spectrum envelope parameters, the fundamental frequency parameters, and the sub-band voicing degree parameters of the speech parameters to be synthesized, respectively. The processing is as shown by the following formula (1):

$$y_t = h_t * x_t \quad (1)$$

where t represents the $t^{th}$ frame in time, $x_t$ represents a rough value of a speech parameter obtained from a model that corresponds to the $t^{th}$ frame, $y_t$ represents a value obtained through filtering smoothing, the operator * represents convolution, and $h_t$ represents an impulse response of a pre-designed filter. Because parameter characteristics are different for different types of acoustic parameters, $h_t$ may be designed in different representations.

The frequency-spectrum envelope parameters and the sub-band voicing degree parameters can be predicted by means of a filter as shown by the following formula (2):

$$y_t = \alpha \cdot y_{t-1} + (1-\alpha) \cdot x_t \quad (2)$$

where α represents a pre-designed constant filter coefficient and may be determined through experiments according to the speed at which the frequency-spectrum envelope parameters and the sub-band voicing degree parameters in the actual speech vary with the time.

The fundamental frequency parameters can be predicted by means of a filter as shown by the following formula (3):

$$y_t = \beta \cdot y_{t-1} + (1-\beta) \cdot x_t \quad (3)$$

where β represents a pre-designed constant filter coefficient and may be determined through experiments according to the speed at which the fundamental frequency parameters in the actual speech vary with the time.

As can be seen, the parameters involved by this filter set used in the present invention in the process of predicting the speech parameters to be synthesized do not include future parameters, and an output frame of some time point only depends on input frames of this time point and its previous time point(s) or an output frame of the previous time point of this time point but is unrelated to future input or output frames, so the capacity of the RAM needed by the filter set can be fixed beforehand. That is, when the acoustic parameters of the speech are predicted by the formulas (2) and (3) in the present invention, the output parameters of the current frame only depend on the input parameters of the current frame and the output parameters of the previous frame.

Thus, the overall process of prediction of the parameters can be achieved by means of a RAM buffer of a fixed capacity, which will not increase with the time length of the speech to be synthesized. Thereby, the speech parameters of any time length can be predicted continuously, and the problem in the prior art that the capacity of the RAM needed in the process of predicting parameters by using the maximum likelihood criterion increases in direct proportion to the time length of the synthesized speech can be solved.

As can be seen from the formulas (2) and (3), when parameter smoothing is performed, by the filter set, on the rough values of the speech parameters to be synthesized at the current time point in this solution, the rough values can be filtered according to the rough values at that time point and information about the speech frame at the previous time point to obtain smoothed speech parameters. Here, the information about the speech frame at the previous time point refers to the smoothed values of the speech parameters predicted at the previous time point.

After the smoothed values of the speech parameters are predicted, the smoothed speech parameters can be optimized by a global parameter optimizer to determine optimized speech parameters (step S240).

In order to make the variance of the synthesized speech parameters consistent with the variance of the speech parameters in the training corpus and to improve the tone quality of the synthesized speech, the variation range of the synthesized speech parameters is adjusted by the following formula (4) in the process of optimizing the speech parameters according to the present invention.

$$\tilde{y}_t = r\cdot(y_t - m) + m$$

$$z_t = w\cdot(\tilde{y}_t - y_t) + y_t \quad (4)$$

where $y_t$ represents a smoothed value of a speech parameter at a time point t before optimization, $\tilde{y}_t$ represents a value after preliminary optimization, $z_t$ represents a value obtained after final optimization, m represents a mean value of the synthesized speech, r represents a standard deviation ratio of the trained speech to the synthesized speech, and w represents a fixed weight for controlling the adjustment effect.

However, when m and r are determined in the prior art parametric speech synthesis method, values of a certain speech parameter corresponding to all the frames are needed to calculate the mean value and the variance, and then the parameters of all the frames can be adjusted by the global variance model so that the variance of the adjusted synthesized speech parameters is consistent with the global variance model so as to improve the tone quality. This is as shown by the formula (5).

$$m = \frac{1}{T}\sum_{t=1}^{T} x_t \quad (5)$$

$$r = \frac{\sigma_c}{\sigma_s} = \frac{\sigma_c}{\sqrt{\frac{1}{T}\sum_{t=1}^{T}(x_t - m)^2}}$$

where T represents that the total time length of the speech to be synthesized is T frames, $\sigma_c$ represents a standard deviation (provided by the global variance model) of a certain speech parameter obtained through statistics on all the speech in the training corpus, and $\sigma_s$ represents a standard deviation of the current speech parameters to be synthesized, which need be recalculated each time when a segment of text is synthesized. Calculation of m and r requires use of the speech parameter values of the synthesized speech corresponding to all the frames before adjustment and the RAM is needed to save the parameters of all the frames before optimization, so the capacity of the RAM needed will increase with the time length of the speech to be synthesized. This makes it impossible for the RAM of the fixed capacity to satisfy the need of continuously synthesizing speech of arbitrary time length.

In view of this shortcoming existing in the prior art, the global parameter optimizer is redesigned during optimization of the parametric speech in the present invention, and the parametric speech is optimized by the following formula (6).

$$m = M$$

$$r = R \quad (6)$$

where M and R are both constants, and represent a mean value and a standard deviation ratio of a certain parameter obtained through statistics on a great deal of synthesized speech, respectively. In a preferred determination method, when global parameter optimization is not applied, a relatively long segment of speech (e.g., synthesized speech of about one hour) is synthesized; and then, the mean value and the standard deviation ratio corresponding to each acoustic parameter are calculated according to the formula (5) and are used as fixed values to be assigned to M and R corresponding to each acoustic parameter.

As can be seen, the global parameter optimizer designed by the present invention comprises the global mean value and the global variance ratio, with the global mean value being used to characterize a mean value of the acoustic parameters of the synthesized speech and the global variance ratio being used to characterize a ratio in variance of the parameters of the synthesized speech and the trained speech. Through use of the global parameter optimizer of the present invention, in each synthesis process, parameters of a frame of speech input can be optimized directly without the need of recalculating the mean value and the standard deviation ratio of the speech parameters from all the synthesized speech frames, so the need of saving the values of all the frames of the speech parameters to be synthesized is eliminated. The problem that the capacity of the RAM needed in the prior art parametric speech synthesis method increases in direct proportion to the time length of the synthesized speech is solved with the RAM of the fixed capacity. In addition, the present invention uses the same m and r for adjustment in each speech synthesis process while the prior art method uses the newly calculated m and r for adjustment in each speech synthesis process, so the present invention is superior to the prior art method in consistency among the synthesized speeches when different texts are synthesized. Moreover, it can be clearly seen that the calculation complexity of the present invention is lower than that of the prior art method.

After the optimized speech parameters are determined, the optimized speech parameters can be synthesized by a parametric speech synthesizer to obtain a frame of speech waveform (step S250).

Figure 6:
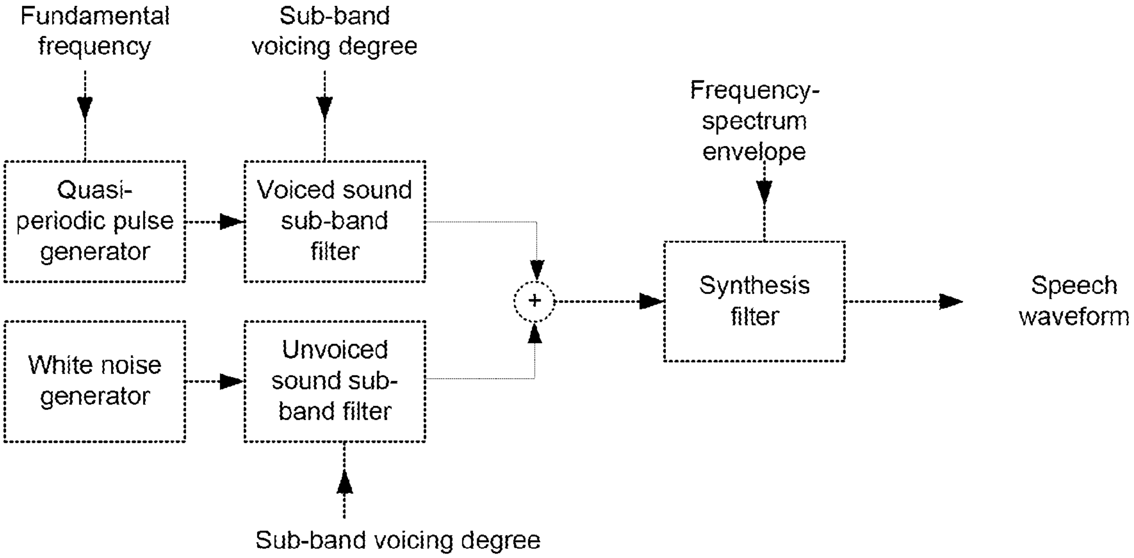
FIG. 6 is a schematic view illustrating a synthesis filter based on mixed excitation according to an embodiment of the present invention.
Figure 7:
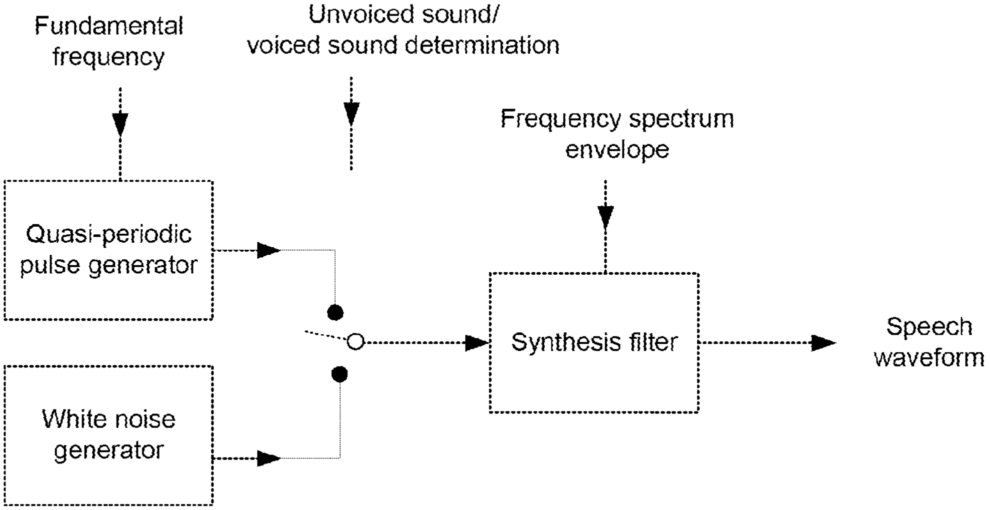
Fig. 7 (PRIOR ART)
FIG. 7 is a schematic view illustrating a synthesis filter based on unvoiced sound/voiced sound determination in the prior art.

FIG. 6 is a schematic view illustrating a synthesis filter based on mixed excitation according to an embodiment of the present invention; and FIG. 7 is a schematic view illustrating a synthesis filter based on unvoiced sound/voiced sound determination in the prior art. As shown in FIG. 6 and FIG. 7, the synthesis filter based on mixed excitation adopted in the present invention is of the source-filter form; and filtering excitation in the prior art is simple binary excitation.

In the prior art parametric speech synthesis technology, the technology used when the speech is synthesized by the parametric synthesizer is the parametric speech synthesis technology based on unvoiced sound/voiced sound determination, which requires use of one preset threshold for hard unvoiced sound/voiced sound determination to determine a frame of synthesized speech as either voiced sounds or unvoiced sounds. This may cause the problem that an unvoiced sound frame appears abruptly among some voiced sounds obtained through synthesis, which causes a clear tone distortion in auditory impression. In the schematic view of the synthesis filter shown in FIG. 7, unvoiced sound/voiced sound prediction is performed before the speech is synthesized, and then excitations are performed, respectively: in case of the unvoiced sounds, white noises are used as excitation; and in case of the voiced sounds, quasi-periodic pulses are used as excitation. Finally, a waveform of the synthesized speech is obtained by means of filtering of these excitations through the synthesis filter. Inevitably, this excitation synthesis method will cause a temporal clear rigid boundary between the unvoiced sounds and the voiced sounds, and thus cause a clear tone quality distortion in the synthesized speech.

However, in the schematic view of the synthesis filter based on mixed excitation of the present invention as shown in FIG. 6, multi-subband unvoiced sound and voiced sound mixed excitation is adopted. The unvoiced sound/voiced sound prediction is not performed, and instead, unvoiced sounds and voiced sounds in each sub-band are mixed according to the voicing degree. Thereby, the unvoiced sounds and the voiced sounds will have no clear rigid boundary temporally therebetween, and the problem in the prior art method that an unvoiced sound appears abruptly among some voiced sounds to cause a clear tone quality distortion is solved. The voicing degree of the current frame of a sub-band can be extracted from the speech of the original corpus according to the following formula (7):

$$c_\tau = \frac{\sum_{t=0}^{T-1} |s_t s_{t+\tau}|}{\sqrt{\sum_{t=0}^{T-1} s_t^2 \sum_{t=0}^{T-1} s_{t+\tau}^2}} \quad (7)$$

where $S_t$ represents a value of a $t^{th}$ speech sample of the current frame of a certain sub-band, $S_{t+\tau}$ represents a value of a speech sample at a time point from time point t by $\tau$, T represents the number of samples of a frame, and $C_\tau$ represents the voicing degree of the current frame of the current sub-band when $\tau$ is taken as a fundamental period.

Specifically, as shown in FIG. 6, the speech parameters generated through global optimization are input into the parametric speech synthesizer. Firstly, a quasi-periodic pulse sequence is constructed according to the fundamental frequency parameters among the speech parameters, and a random sequence is constructed by white noises. Then, a voiced sound component of a signal is obtained from the constructed quasi-periodic pulse sequence through a voiced sound subband filter constructed by the voicing degree, and an unvoiced sound component of the signal is obtained from the random sequence through an unvoiced sound sub-band filter constructed by the voicing degree. A mixed excitation signal can be obtained from the sum of the voiced sound component and the unvoiced sound component. Finally, the mixed excitation signal is filtered by a synthesis filter constructed by the frequency-spectrum envelope parameters to output a frame of synthesized speech waveform.

Of course, after the optimized speech parameters are determined, it is still possible to firstly perform the unvoiced sound/voiced sound determination, with mixed excitation being used in case of the voiced sounds and only white noises being used in case of the unvoiced sounds. However, this solution also causes the problem of the tone quality distortion due to the rigid boundary. Therefore, in a preferred implementation of the present invention, unvoiced sound/voiced sound prediction is not performed and the implementation of multi-subband unvoiced sound and voiced sound mixed excitation is used.

Because of the advantage of continuously synthesizing speech of any time length, the present invention can cyclically continue to process a next frame of speech after outputting a frame of speech waveform. The optimized speech parameters of the next frame are not generated and stored in the RAM in advance. So after the current frame is processed, it is needed to return to the step S220 to take out rough values of parameters of the next frame of speech of the phone from the model. Only if the steps S220~S250 are repeated to perform speech synthesis processing on the next frame of the phone, can the next frame of speech waveform be finally output. This process is cyclically performed until the parameters of all the frames of the models of all the phones are processed and all the speech is synthesized.

The parametric speech synthesis method of the present invention may be implemented through software, hardware, or a combination of software and hardware.

Figure 8:
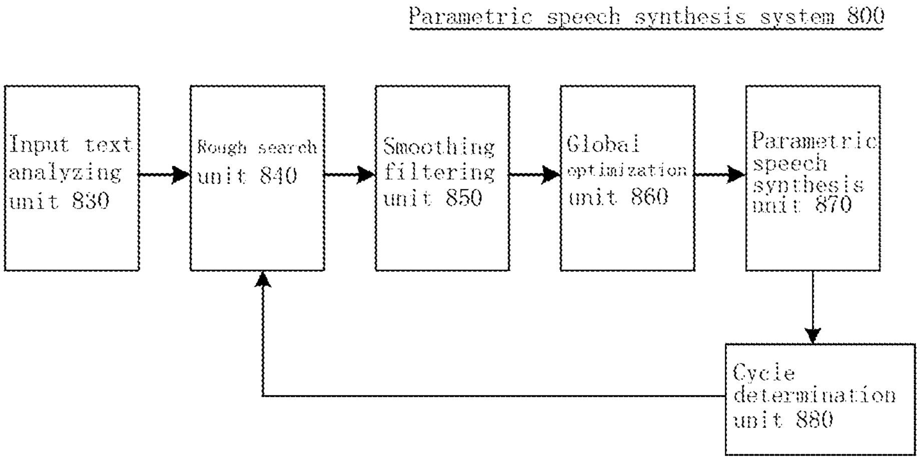
FIG. 8 is a schematic block diagram of a parametric speech synthesis system according to another embodiment of the present invention.

FIG. 8 is a schematic block diagram of a parametric speech synthesis system 800 according to another embodiment of the present invention. As shown in FIG. 8, a parametric speech synthesis system 800 comprises an input text analyzing unit 830, a rough search unit 840, a smoothing filtering unit 850, a global optimization unit 860, a parametric speech synthesis unit 870 and a cycle determination unit 880. The parametric speech synthesis system 800 may further comprise an acoustic parameter extracting unit and a statistic model training unit (not shown) for corpus training.

The acoustic parameter extracting unit is configured to extract acoustic parameters of speech in a training corpus; and the statistic model training unit is configured to train a statistic model corresponding to the acoustic parameters of each phone under different context informations according to the acoustic parameters extracted by the acoustic parameter extracting unit and to save the statistic model into a statistic model library.

The input text analyzing unit 830 is configured to analyze an input text and acquire a phone sequence comprising context information according to analysis of the input text. The rough search unit 840 is configured to take out one phone in the phone sequence sequentially, search in the statistic model library for the statistic model corresponding to the acoustic parameters of the phone acquired by the input text analyzing unit 830 and take out the statistic model of the phone on a frame basis, as rough values of speech parameters to be synthesized. The smoothing filtering unit 850 is configured to use a filter set to filter the rough values of the speech parameters to be synthesized to obtain smoothed speech parameters. The global optimization unit 860 is configured to use a global parameter optimizer to perform global parameter optimization on the speech parameters smoothed by the smoothing filtering unit 850 to obtain optimized speech parameters. The parametric speech synthesis unit 870 is configured to use a parametric speech synthesizer to synthesize the speech parameters optimized by the global optimization unit 860 to output synthesized speech.

The cycle determination unit 880 is connected between the parametric speech synthesis unit 870 and the rough search unit 840 and is configured to determine whether there is an unprocessed frame in the phone after a frame of speech waveform is output. If yes, then for the next frame of the phone, the rough search unit, the smoothing filtering unit, the global optimization unit, and the parametric speech synthesis unit are used repeatedly to continue the cyclical process of searching for and obtaining the rough values of the statistic model corresponding to the acoustic parameters, obtaining the smoothed values through filtering, the global optimization, and the parametric speech synthesis, until all the frames of all the phones in the phone sequence are processed.

The optimized speech parameters of the next frame are not generated and stored in the RAM in advance. So after the current frame is processed, it is needed to return to the rough search unit 840 to take out the next frame of the phone from the model. Only if the rough search unit 840, the smoothing filtering unit 850, the global optimization unit 860, and the parametric speech synthesis unit 870 are used repeatedly for speech synthesis processing, can the next frame of speech waveform be finally output. This process is cycled until the parameters of all the frames of all the phones in all the phone sequences are processed and all the speech is synthesized.

Corresponding to the aforesaid method, in a preferred implementation of the present invention, the statistic model training unit further comprises an acoustic parameter model training unit, a clustering unit, an enforced alignment unit, a status time-length model training unit, and a model statistic unit (not shown). Specifically, the acoustic parameter model training unit is configured to train one model for the acoustic parameters of each phone according to the context information of the phone;

the clustering unit is configured to cluster related phones according to the context information of the phone;

the enforced alignment unit is configured to perform an enforced frame-to-status alignment on the speech in the training corpus by using the model;

the status time-length model training unit is configured to, according to the time-length information generated by the enforced alignment unit during the enforced alignment, train status time-length models of the phones after being clustered under different context informations; and the model statistic unit is configured to form a statistic model library by using the statistic model corresponding to the acoustic parameters of each phone under different context informations.

Figure 9:
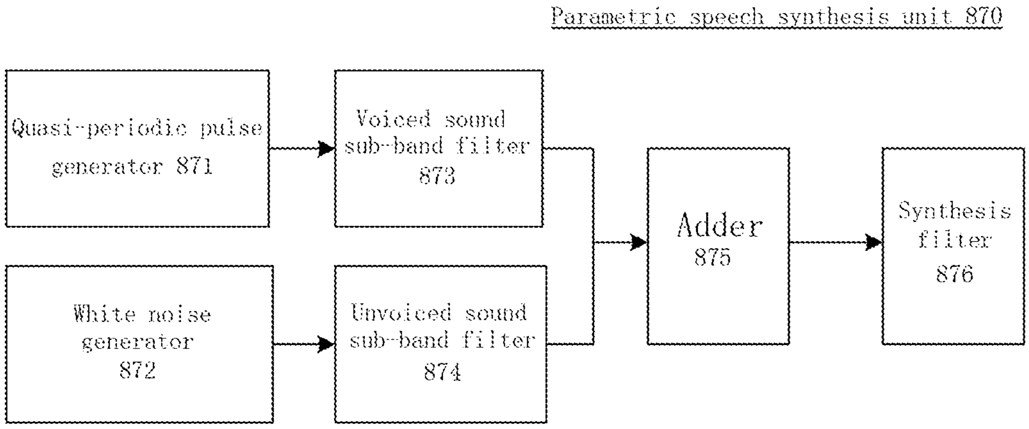
FIG. 9 is a schematic view illustrating a logic structure of a parametric speech synthesis unit according to another embodiment of the present invention.

FIG. 9 is a schematic view illustrating a logic structure of a parametric speech synthesis unit according to a preferred embodiment of the present invention. As shown in FIG. 9, the parametric speech synthesis unit 870 further comprises a quasi-periodic pulse generator 871, a white noise generator 872, a voiced sound sub-band filter 873, an unvoiced sound sub-band filter 874, an adder 875, and a synthesis filter 876. The quasi-periodic pulse generator 871 is configured to construct a quasi-periodic pulse sequence according to the fundamental frequency parameters among the speech parameters. The white noise generator 872 is configured to construct a random sequence by means of white noises. The voiced sound sub-band filter 873 is configured to determine a voiced sound component of a signal from the constructed quasi-periodic pulse sequence according to the sub-band voicing degree. The unvoiced sound sub-band filter 874 is configured to determine an unvoiced sound component of the signal from the random sequence according to the sub-band voicing degree. Then, the voiced sound component and the unvoiced sound component are added by the adder 875 to obtain a mixed excitation signal. Finally, the mixed excitation signal is filtered in the synthesis filter 876 constructed by the frequency-spectrum envelope parameters to output a corresponding frame of synthesized speech waveform.

As can be seen, the synthesis method of the present invention is achieved through longitudinal processing. That is, synthesis of each frame of speech requires four steps of taking out rough values of a statistic model, obtaining smoothed values through filtering, obtaining optimized values through global optimization, and obtaining speech through parametric speech synthesis; and the four steps are repeated for synthesis of each subsequent frame of speech. On the other hand, the prior art parametric speech synthesis method is achieved through transverse off-line processing, i.e., taking out rough parameters of all the models, generating smoothed parameters of all the frames by using the maximum likelihood algorithm, obtaining optimized parameters of all the frames by using the global variance model, and finally outputting all the frames of speech from the parametric synthesizer. As compared to the prior art parametric speech synthesis method which requires to save the parameters of all the frames in each layer, the longitudinal processing manner of the present invention only needs to save the parameters of the fixed storage capacity needed by the current frame and thus can also solve the problem in the prior art method that the time length of the synthesized speech is limited due to use of the transverse processing manner.

In addition, by using only the static parameters instead of the dynamic parameters and variance information in the synthesizing phase, the present invention can reduce the capacity of the model library to about 1/6 of that of the prior art method. By using the specifically designed filter set in place of the maximum likelihood parameter method to smoothly generate the parameters and using the new global parameter optimizer in place of the global variance model in the prior art method to optimize the speech parameters, and in combination with the longitudinal processing structure, the present invention achieves the function of continuously predicting speech parameters of any time length by means of the RAM of the fixed capacity. This can solve the problem in the prior art method that speech parameters of arbitrary time length cannot be continuously predicted on a chip having an RAM of a small capacity, and is conducive to expand application of the speech synthesis method on a chip with a small storage space. With the unvoiced sound and voiced sound mixed excitation at each time point in place of the prior art method which performs hard unvoiced sound/voiced sound determination before synthesizing the speech waveform, the problem in the prior art method that a unvoiced sound appears abruptly during the synthesis of some voiced sounds to cause a tone quality distortion is solved so that the generated speech is more consistent and coherent.

Figure 10:
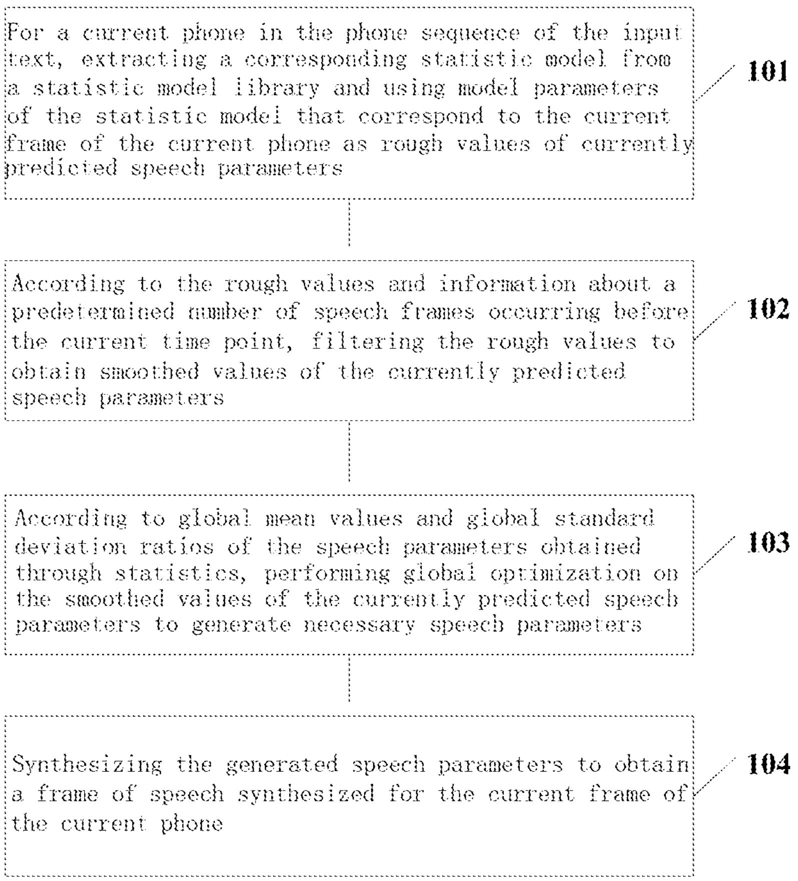
FIG. 10 is a flowchart diagram of a parametric speech synthesis method according to a further embodiment of the present invention.

Referring to FIG. 10, a further embodiment of the present invention provides a parametric speech synthesis method, which comprises a synthesizing phase in which each frame of speech of each phone in a phone sequence of an input text is sequentially processed as follows:

101: for a current phone in the phone sequence of the input text, extracting a corresponding statistic model from a statistic model library and using model parameters of the statistic model that correspond to the current frame of the current phone as rough values of currently predicted speech parameters;

102: according to the rough values and information about a predetermined number of speech frames occurring before the current time point, filtering the rough values to obtain smoothed values of the currently predicted speech parameters;

103: according to global mean values and global standard deviation ratios of the speech parameters obtained through statistics, performing global optimization on the smoothed values of the currently predicted speech parameters to generate necessary speech parameters; and

104: synthesizing the generated speech parameters to obtain a frame of speech synthesized for the current frame of the current phone.

Further, according to the present solution, in the process of predicting speech parameters to be synthesized, the parameters involved during prediction do not include future parameters, and an output frame of some time point only depends on input frames of this time point and its previous time points or an output frame of the previous time point of that time point, but is unrelated to future input or output frames. Specifically, in the step 102, the rough values can be filtered according to the rough values and information about speech frames occurring at the previous time point to obtain the smoothed values of the currently predicted speech parameters; and the information about the speech frames occurring at the previous time point is smoothed values of speech parameters predicted at the previous time point.

Further, when the predicted speech parameters are frequency-spectrum envelope parameters and sub-band voicing degree parameters, the rough values are filtered based on the rough values and the smoothed values of the speech parameters predicted at the previous time point according to the following formula (see the aforesaid formula (2)) to obtain the smoothed values of the currently predicted speech parameters:

$$y_t=\alpha\cdot y_{t-1}+(1-\alpha)\cdot x_t.$$

When the predicted speech parameters are fundamental frequency parameters, the rough values are filtered based on the rough values and the smoothed values of the speech parameters predicted at the previous time point according to the following formula (see the aforesaid formula (3)) to obtain the smoothed values of the currently predicted speech parameters:

$$y_t=\beta\cdot y_{t-1}+(1-\beta)\cdot x_t.$$

In the aforesaid formulas, t represents a time point being $t^{th}$ frame, $x_t$ represents a rough value of a predicted speech parameter corresponding to the $t^{th}$ frame, $y_t$ represents a value of $x_t$ after being filtered and smoothed, and α and β represent coefficients of the filter, respectively, and α and β have different values.

Further, the step 104 of this solution may comprise the processes of:

using sub-band voicing degree parameters to construct a voiced sound sub-band filter and a unvoiced sound sub-band filter;

filtering a quasi-periodic pulse sequence constructed by fundamental frequency parameters in the voiced sound sub-band filter to obtain a voiced sound component of a speech signal; filtering a random sequence constructed by white noises in the unvoiced sound sub-band filter to obtain a unvoiced sound component of the speech signal;

adding the voiced sound component and the unvoiced sound component to obtain a mixed excitation signal; and filtering the mixed excitation signal in a filter constructed by frequency-spectrum envelope parameters to output a frame of synthesized speech waveform.

Further, this solution further comprises a training phase prior to the synthesizing phase. In the training phase, acoustic parameters extracted from a corpus comprise only static parameters or comprise both static parameters and dynamic parameters; only static model parameters among model parameters of statistic model obtained after training are retained; and the step 101 in the synthesizing phase may comprise: according to the current phone, using the static model parameters of the statistic model obtained in the training phase that correspond to the current frame of the current phone as the rough values of the currently predicted speech parameters.

Figure 11:
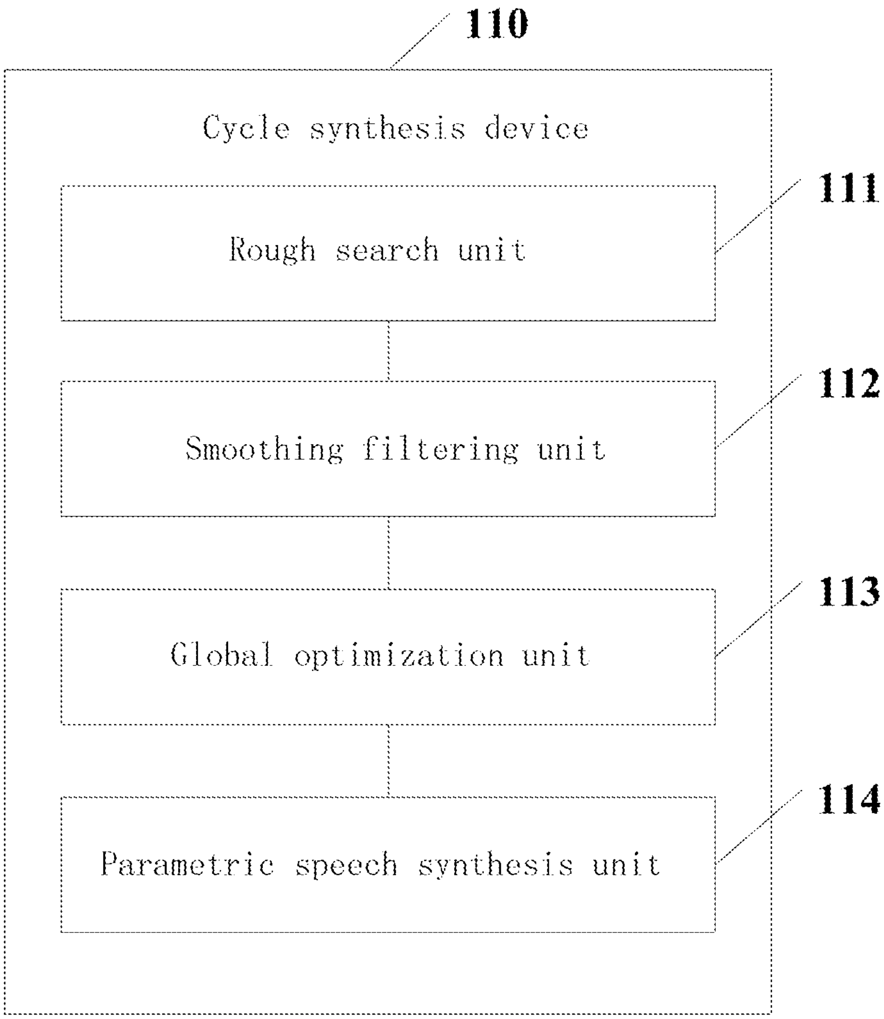
FIG. 11 is a schematic structural view of a parametric speech synthesis system according to a further embodiment of the present invention.

Referring to FIG. 11, a further embodiment of the present invention further provides a parametric speech synthesis system, which comprises:

a cycle synthesis device 110, being configured to perform speech synthesis on each frame of speech of each phone in a phone sequence of an input text sequentially in a synthesizing phase.

The cycle synthesis device 110 comprises:

a rough search unit 111, being configured to, for a current phone in the phone sequence of the input text, extract a corresponding statistic model from a statistic model library and use model parameters of the statistic model that correspond to the current frame of the current phone as rough values of currently predicted speech parameters;

a smoothing filtering unit 112, being configured to, according to the rough values and information about a predetermined number of speech frames occurring before the current time point, filter the rough values to obtain smoothed values of the currently predicted speech parameters;

a global optimization unit 113, being configured to, according to global mean values and global standard deviation ratios of the speech parameters obtained through statistics, perform global optimization on the smoothed values of the currently predicted speech parameters to generate necessary speech parameters; and a parametric speech synthesis unit 114, being configured to synthesize the generated speech parameters to obtain a frame of speech synthesized for the current frame of the current phone.

Further, the smoothing filtering unit 112 comprises a low-pass filter set, which is configured to, according to the rough values and information about speech frames occurring at the previous time point, filter the rough values to obtain the smoothed values of the currently predicted speech parameters; and the information about the speech frames occurring at the previous time point is smoothed values of speech parameters predicted at the previous time point.

Further, when the predicted speech parameters are frequency-spectrum envelope parameters and sub-band voicing degree parameters, the low-pass filter set filters the rough values by using the rough values and the smoothed values of the speech parameters predicted at the previous time point according to the following formula to obtain the smoothed values of the currently predicted speech parameters:

$$y_t=\alpha\cdot y_{t-1}+(1-\alpha)\cdot x_t.$$

When the predicted speech parameters are fundamental frequency parameters, the low-pass filter set filters the rough values by using the rough values and the smoothed values of the speech parameters predicted at the previous time point according to the following formula to obtain the smoothed values of the currently predicted speech parameters:

$$y_t=\beta\cdot y_{t-1}+(1-\beta)\cdot x_t.$$

In the aforesaid formulas, t represents the time point being the $t^{th}$ frame, $x_t$ represents a rough value of a predicted speech parameter at the $t^{th}$ frame, $y_t$ represents a value of $x_t$ after being filtered and smoothed, and α and β represent coefficients of the filter, respectively, and α and β have different values.

Further, the global optimization unit 113 comprises a global parameter optimizer, which is configured to, according to the global mean values and the global standard deviation ratios of the speech parameters obtained through statistics, perform global optimization on the smoothed values of the currently predicted speech parameters to generate the necessary speech parameters by using the following formula:

$$\tilde{y}_t=r\cdot(y_t-m)+m$$

$$z_t=w\cdot(\tilde{y}_t-y_t)+y_t$$

where $y_t$ represents a smoothed value of a speech parameter at a time point t before optimization, $\tilde{y}_t$ represents a value after preliminary optimization, w represents a weight value, $x_t$ represents the necessary speech parameter obtained after the global optimization, r represents a global standard deviation ratio of a predicted speech parameter obtained through statistics, m represents a global mean value of the predicted speech parameter obtained through statistics, and r and m are constants.

Further, the parametric speech synthesis unit 114 comprises:

a filter constructing module, being configured to use sub-band voicing degree parameters to construct a voiced sound sub-band filter and a unvoiced sound sub-band filter;

the voiced sound sub-band filter, being configured to filter a quasi-periodic pulse sequence constructed by fundamental frequency parameters to obtain a voiced sound component of a speech signal;

the unvoiced sound sub-band filter, being configured to filter a random sequence constructed by white noises to obtain a unvoiced sound component of the speech signal;

an adder, being configured to add the voiced sound component and the unvoiced sound component to obtain a mixed excitation signal; and a synthesis filter, being configured to filter the mixed excitation signal in a filter constructed by frequency-spectrum envelope parameters to output a frame of synthesized speech waveform.

Further, the system further comprises a training device, which is configured to extract from a corpus acoustic parameters which comprise only static parameters or comprise both static parameters and dynamic parameters in a training phase, and only static model parameters among model parameters of statistic model obtained after training are retained; and the rough search unit 111 is configured to, according to the current phone, use the static model parameters of the statistic model obtained in the training phase that correspond to the current frame of the current phone as the rough values of the currently predicted speech parameters in the synthesizing phase.

For related operations of the rough search unit 111, the smoothing filtering unit 112, the global optimization unit 113, and the parametric speech synthesis unit 114 in this embodiment of the present invention, reference may be respectively made to what described about the rough search unit 840, the smoothing filtering unit 850, the global optimization unit 860, and the parametric speech synthesis unit 870 in the aforesaid embodiment.

According to the above descriptions, the technical solutions of the embodiments of the present invention provide a novel parametric speech synthesis solution by using technical means such as information about a speech frame occurring before a current frame as well as global mean values and global standard deviation ratios of the speech parameters obtained through statistics in advance.

This solution adopts a longitudinal processing manner in the synthesizing phase to sequentially synthesize each frame of speech, and only the parameters of the fixed capacity needed by the current frame are saved in the synthesizing process. This novel longitudinal processing architecture of this solution can achieve synthesis of speech of any time length by means of an RAM of a fixed capacity, so the requirement on the capacity of the RAM during speech synthesis is reduced significantly. Thereby, speech of any time length can be continuously synthesized on a chip having an RAM of a small capacity.

This solution can synthesize speech that is highly continuous, consistent and natural and is conducive to popularization and application of the speech synthesis method on a chip with a small storage space.

The parametric speech synthesis method and system of the present invention have been illustrated with reference to the attached drawings. However, it shall be understood by those skilled in this art that, various modifications may be made on the parametric speech synthesis method and system of the present invention without departing from what described in the present invention. Therefore, the scope of the present invention shall be determined by the appended claims.

The invention claimed is:

1. A parametric speech synthesis method, comprising:

analyzing an input text;

acquiring a phone sequence based on analysis of the input text, the phone sequence including a plurality of speech frames;

synthesizing the phone sequence by synthesizing the plurality of speech frames in a sequential manner, each speech frame being synthesized by performing the following iteration;

extracting a corresponding statistic model from a statistic model library and using model parameters of the statistic model that correspond to the speech frame as rough values for predicting speech parameters of the speech frame;

according to the rough values and information about a predetermined number of preceding speech frames, filtering the rough values to obtain smoothed values for predicting speech parameters of the speech frame;

according to global mean values and global standard deviation ratios of speech parameters obtained through statistics, performing global optimization on the smoothed values to generate speech parameters of the speech frame, wherein the global optimization comprises the global mean values and global standard deviation ratios being fixed values using the same values for adjustment in each speech synthesis process without the need of recalculating the global mean and the standard deviation ratios in each speech synthesis process; and synthesizing the optimized speech parameters to obtain a frame of speech waveform.

2. The parametric speech synthesis method of claim 1, wherein the information about the preceding speech frames is smoothed values of speech parameters predicted at a previous time point.

3. The parametric speech synthesis method of claim 1, wherein the step of performing global optimization includes performing global optimization by using the following formula:

$$\tilde{y}=r\cdot(y_t-m)+m$$

$$\tilde{z}_t=w\cdot(y_t-y_t)+y_t$$

where $y_t$ represents a smoothed value of a speech parameter at a time point t before optimization, $\tilde{y}_t$ represents a value after preliminary optimization, w represents a weight value, $z_t$ represents the optimized speech parameter obtained after the global optimization, r represents a global standard deviation ratio of a predicted speech parameter obtained through statistics, m represents a global mean value of the predicted speech parameter obtained through statistics, and r=R and m=M, where R and M are constants.

4. The parametric speech synthesis method of claim 1, wherein the step of synthesizing the optimized speech parameters to obtain a frame of speech waveform includes:

using sub-band voicing degree parameters to construct a voiced sound sub-band filter and a unvoiced sound sub-band filter;

filtering a quasi-periodic pulse sequence constructed by fundamental frequency parameters in the voiced sound sub-band filter to obtain a voiced sound component of a speech signal;

filtering a random sequence constructed by white noises in the unvoiced sound sub-band filter to obtain a unvoiced sound component of the speech signal;

adding the voiced sound component and the unvoiced sound component to obtain a mixed excitation signal; and filtering the mixed excitation signal in a filter constructed by frequency-spectrum envelope parameters to output a frame of synthesized speech waveform.

5. The parametric speech synthesis method of claim 1, further comprising a training phase prior to the synthesizing phase, wherein in the training phase, acoustic parameters extracted from a corpus comprise only static parameters or comprise both static parameters and dynamic parameters;

only static model parameters among model parameters of statistic model obtained after training are retained; and wherein the step of using model parameters of the statistic model that correspond to the speech frame as rough values for predicting speech parameters of the speech frame includes:

using the static model parameters of the statistic model obtained in the training phase that correspond to the speech frame as the rough values for predicting the speech parameters of the speech frame.

6. A parametric speech synthesis system, comprising:

A cycle synthesis device for performing speech synthesis on a phone sequence of an input text, the phone sequence including a plurality of speech frames, the cycle synthesis device being configured to synthesize the phone sequence by synthesizing the plurality of speech frames in a sequential manner in a synthesizing phase;

where the cycle synthesis device comprises:

a rough search unit, being configured to extract a corresponding statistic model from a statistic model library and using model parameters of the statistic model that correspond to the speech frame as rough values for predicting speech parameters of the speech frame;

a smoothing filtering unit, being configured to, according to the rough values and information about a predetermined number of preceding speech frames, filtering the rough values to obtain smoothed values for predicting speech parameters of the speech frame;

a global optimization unit, being configured to, according to global mean values and global standard deviation ratios of speech parameters obtained through statistics, performing global optimization on the smoothed values to generate speech parameters of the speech frame, wherein the global optimization comprises the global mean values and global standard deviation ratios being fixed values using the same values for adjustment in each speech synthesis process without the need of recalculating the global mean and the standard deviation ratios in each speech synthesis process; and a parametric speech synthesis unit, being configured to synthesize the optimized speech parameters to obtain a frame of speech waveform.

7. The parametric speech synthesis system of claim 6, wherein the smoothing filtering unit comprises a low-pass filter set, the low-pass filter set is configured to, according to the rough values and information about the preceding speech frames, filter the rough values to obtain the smoothed values for predicting speech parameters of the speech frame;

wherein the information about the preceding speech frames is smoothed values of speech parameters predicted at a previous time point.

8. The parametric speech synthesis system of claim 6, wherein the global optimization unit comprises a global parameter optimizer, the global parameter optimizer is configured to, according to the global mean values and the global standard deviation ratios of the speech parameters obtained through statistics, perform global optimization on the smoothed values by using the following formula:

$$\tilde{y}_t = r\cdot(y_t - m) + m$$

$$z_t = w\cdot(\tilde{y}_t - y_t) + y_t$$

where $y_t$ represents a smoothed value of a speech parameter at a time point t before optimization, $\tilde{y}_t$ represents a value after preliminary optimization, w represents a weight value, $z_t$ represents the optimized speech parameter obtained after the global optimization, r represents a global standard deviation ratio of a predicted speech parameter obtained through statistics, m represents a global mean value of the predicted speech parameter obtained through statistics, and r=R and m=M, where R and M are constants.

9. The parametric speech synthesis system of claim 6, wherein the parametric speech synthesis unit comprises:

a filter constructing module, being configured to use sub-band voicing degree parameters to construct a voiced sound sub-band filter and a unvoiced sound sub-band filter;

the voiced sound sub-band filter, being configured to filter a quasi-periodic pulse sequence constructed by fundamental frequency parameters to obtain a voiced sound component of a speech signal;

the unvoiced sound sub-band filter, being configured to filter a random sequence constructed by white noises to obtain a unvoiced sound component of the speech signal;

an adder, being configured to add the voiced sound component and the unvoiced sound component to obtain a mixed excitation signal; and a synthesis filter, being configured to filter the mixed excitation signal in a filter constructed by frequency-spectrum envelope parameters to output a frame of synthesized speech waveform.

10. The parametric speech synthesis system of claim 6, further comprising a training device, wherein the training device is configured to extract from a corpus acoustic parameters which comprise only static parameters or comprise both static parameters and dynamic parameters in a training phase, and only static model parameters among model parameters of statistic model obtained after training are retained; and the rough search unit is configured to use the static model parameters of the statistic model obtained in the training phase that correspond to the speech frame as rough values for predicting the speech parameters of the speech frame.

* * * * *